United States Patent
Ishii et al.

(10) Patent No.: US 8,369,239 B2
(45) Date of Patent: Feb. 5, 2013

(54) BASE STATION APPARATUS AND METHOD IN MOBILE COMMUNICATION SYSTEM

(75) Inventors: Hiroyuki Ishii, Yokosuka (JP); Yoshihisa Kishiyama, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 246 days.

(21) Appl. No.: 12/989,342

(22) PCT Filed: Apr. 20, 2009

(86) PCT No.: PCT/JP2009/057865
§ 371 (c)(1),
(2), (4) Date: Dec. 8, 2010

(87) PCT Pub. No.: WO2009/131099
PCT Pub. Date: Oct. 29, 2009

(65) Prior Publication Data
US 2011/0116464 A1    May 19, 2011

(30) Foreign Application Priority Data
Apr. 25, 2008   (JP) .................................. 2008-115486

(51) Int. Cl.
*H04J 1/16* (2006.01)
*H04J 3/16* (2006.01)
*H04Q 7/00* (2006.01)
(52) U.S. Cl. ......................... 370/252; 370/329; 370/465
(58) Field of Classification Search ................. 370/252, 370/328, 329, 465
See application file for complete search history.

(56) References Cited

U.S. PATENT DOCUMENTS

| | | | |
|---|---|---|---|
| 2004/0013190 A1* | 1/2004 | Jayaraman et al. | 375/233 |
| 2005/0143025 A1* | 6/2005 | Suzuki | 455/114.3 |
| 2005/0213652 A1* | 9/2005 | Higashino | 375/233 |
| 2007/0230396 A1* | 10/2007 | Watanabe | 370/329 |
| 2008/0293426 A1* | 11/2008 | Kim et al. | 455/450 |
| 2009/0323618 A1* | 12/2009 | Wild | 370/329 |
| 2010/0014109 A1* | 1/2010 | Debaere | 358/1.13 |

(Continued)

FOREIGN PATENT DOCUMENTS

| | | |
|---|---|---|
| JP | 2004-134898 A | 4/2004 |
| JP | 2007-181125 A | 7/2007 |

(Continued)

OTHER PUBLICATIONS

Patent Abstracts of Japan, Publication No. 2007-181125, dated Jul. 12, 2007, 1 page.

(Continued)

*Primary Examiner* — Andrew Lee
(74) *Attorney, Agent, or Firm* — Osha Liang LLP

(57) ABSTRACT

A base station apparatus includes a scheduler configured to schedule assignment of radio resources based on a scheduling coefficient for one or more user equipments, a control signal generation unit configured to generate a control signal including reporting indication information for indicating whether the user equipment is to report downlink channel state information and scheduling grant information for indicating the scheduled assignment of the radio resources and a transmitting unit configured to transmit the control signal in a downlink. A cumulative value is calculated for each of the user equipments. The reporting indication information transmitted to a user equipment, whose cumulative value reaches a predefined value, indicates that the user equipment is to report the downlink channel state information. The cumulative value is updated if the scheduling coefficient satisfies a predefined condition.

11 Claims, 8 Drawing Sheets

U.S. PATENT DOCUMENTS

| | | | | |
|---|---|---|---|---|
| 2010/0027610 | A1* | 2/2010 | Chang | 375/233 |
| 2010/0323625 | A1* | 12/2010 | Kishigami et al. | 455/65 |
| 2011/0013506 | A1* | 1/2011 | Ishii et al. | 370/208 |
| 2011/0070919 | A1* | 3/2011 | Komine et al. | 455/522 |
| 2012/0106519 | A1* | 5/2012 | Kishigami et al. | 370/336 |

FOREIGN PATENT DOCUMENTS

| | | |
|---|---|---|
| JP | 2008-060824 A | 3/2008 |

OTHER PUBLICATIONS

Patent Abstracts of Japan, Publication No. 2004-134898, dated Apr. 30, 2004, 1 page.

Patent Abstracts of Japan, Publication No. 2008-060824, dated Mar. 13, 2008, 1 page.

3GPP TS 36.300 V8.4.0, Mar. 2008, "Evolved Universal Terrestrial Radio Access (E-UTRA) and Evolved Universal Terrestrial Radio Access Network (E-UTRAN), Overall Description," 126 pages.

3GPP TS 36.213 V8.2.0, Mar. 2008, "Evolved Universal Terrestrial Radio Access (E-UTRA), Physical Layer Procedures," 30 pages.

International Search Report issued in PCT/JP2009/057865, mailed on Jun. 2, 2009, with translation, 7 pages.

Written Opinion issued in PCT/JP2009/057865, mailed on Jun. 2, 2009, 3 pages.

* cited by examiner

FIG.6

| SUBFRAME (TTI) | 1 | 2 | 3 | 4 | 5 | 6 | 7 | 8 | 9 | 10 | 11 | 12 | 13 | 14 | 15 | 16 | 17 | 18 | ... |
|---|---|---|---|---|---|---|---|---|---|---|---|---|---|---|---|---|---|---|---|
| GOODNESS OF SCHEDULING COEFFICIENTS (RANK) | 10 | 9 | 7 | 6 | 5 | 2 | 16 | 15 | 13 | 7 | 7 | 6 | 5 | 4 | 1 | 14 | 11 | 9 | |
| CUMULATIVE VALUE (I) | 1 | 1 | 1 | 1 | 1 | 2 | 2 | 2 | 2 | 2 | 2 | 2 | 2 | 2 | 3 | 3 | 3 | 3 | |
| CUMULATIVE VALUE (II) | 1 | 2 | 3 | 4 | 5→0 | 1 | 1 | 1 | 1 | 2 | 3 | 4 | 5→0 | 1 | 2 | 2 | 2 | 3 | |

BASE STATION APPARATUS AND METHOD IN MOBILE COMMUNICATION SYSTEM

TECHNICAL FIELD

The present invention relates to the technical field of mobile communications and more particularly relates to a base station apparatus and a method in a mobile communication system.

BACKGROUND ART

In this type of technical field, the next generation mobile communication schemes, which may become successors of W-CDMA and HSDPA, are being discussed by standardization group 3GPP. Typical ones of the next generation mobile communication systems are a LTE (Long Term Evolution) system and an IMT advanced system (the fourth generation mobile communication system). Summary of the LTE is described in non-patent document 1, for example.

In the LTE, one or more physical channels in both uplinks and downlinks are shared among multiple mobile stations (user equipments) for communications. The channel shared among multiple mobile stations is generally called a shared channel and is referred to as a PUSCH (Physical Uplink Shared Channel) for the uplinks and a PDSCH (Physical Downlink Shared Channel) for the downlinks. Also, transport channels mapped to the PUSCH and the PDSCH are referred to as an Uplink-Shared Channel (UL-SCH) and a Downlink-Shared Channel (DL-SCH), respectively.

In a communication system using the shared channels, it is necessary to signal which mobile stations are assigned the shared channels for each subframe. This assignment of radio resources is called scheduling. The subframe may be of 1 ms, for example, (although other values may be used) which may be called a TTI (Transmission Time Interval). Control channels used for the signaling are referred to as a PDCCH (Physical Downlink Control Channel) in the LTE. The PDCCH may be referred to as a Downlink L1/L2 control channel, a DL L1/L2 control channel or DCI (Downlink Control Information). The PDCCH may include a DL/UL Scheduling Grant and/or a TPC (Transmission Power Control) bit, for example.

More specifically, the DL scheduling grant may include downlink resource block assignment information, a user equipment (UE) ID, the number of streams, information on precoding vectors, information on a data size and a modulation scheme, information on HARQ (Hybrid Automatic Repeat reQuest) and/or others, for example. The DL scheduling grant may be referred to as DL assignment information, DL scheduling information or others.

Also, the UL scheduling grant may include uplink resource block assignment information, a user equipment (UE) ID, information on a data size and a modulation scheme, uplink transmit power information, information on demodulation reference signals, a CQI request bit and/or others, for example.

The scheduling is conducted depending on quality of channel state. The uplink channel state can be measured at a base station based on reception quality of reference signals (or pilot channels) transmitted from a user equipment. The downlink channel state is measured at the user equipment, and the measurement result is reported to the base station. Specifically, the base station transmits a reference signal (or a pilot channel) in downlinks, and the user equipment measures the downlink channel state based on the reception quality of the reference signal. The downlink channel state may be represented as a channel quality indicator (CQI) resulting from quantization of a quality measurement value such as a reception level or SINR. The CQI may be referred to as CSI being a generic indicator of the CQI, a PMI (Pre-coding Matrix Indicator) and a RI (Rank Indicator).

Generally, there are two methods of reporting the CQI to the base station. In the first method, a dedicated control resource is assigned to a user equipment in advance, and the CQI is periodically reported without explicit indication from the base station. The dedicated control resource is referred to as a PUCCH (Physical Uplink Control Channel). If uplink transmission of a shared channel is allowed, the CQI may be transmitted in the PUSCH instead of in the PUCCH.

In the second method, the CQI s reported depending on explicit indication from the base station. As stated above, the uplink scheduling grant includes the CQI request bit, and the CQI request bit is indicated to the user equipment through transmission of the uplink scheduling grant. If the CQI request bit is equal to a predefined value (e.g., "1"), the allowed uplink shared channel is used to report the CQI. In other words, the allowed uplink shared channel is used to transmit both the CQI and traffic data. On the other hand, if the CQI request bit is not equal to the predefined value (e.g., "0"), the allowed uplink shared channel is used to transmit user's traffic data. The second method is preferable over the first method for the case where a large amount of information is reported at one time. The method of using the CQI request bit to indicate necessity of reporting the CQI to the user equipment is described in non-patent document 2, for example.

RELATED ART DOCUMENT

Non-patent document 1: 3GPP TS36 300 (V8.4.0), "E-UTRA and E-UTRAN Overall description", February 2008

Non-patent document 2: 3GPP TS36 213 (V8.2.0), "E-UTRA Physical layer procedures", 7.2.1, February 2008

DISCLOSURE OF INVENTION

Problem to be Solved by the Invention

From the viewpoint that a base station has to have knowledge of up-to-date and exact downlink channel state, it is preferred that the CQI is frequently reported from a user equipment. On the other hand, it may not be useful to know the up-to-date channel state in detail for a user that transmits downlink data infrequently. Frequent reporting of the CQI from the user leads to unnecessary consumption of uplink resources. Also, it not preferred to consume excessive uplink resources particularly in a congested system. This may bring trouble to other users that desire uplink communications.

In other words, there are cases where the CQI has to be reported from the user and where the CQI should not be reported from the user, and the reporting of the CQI from the user has to be controlled depending on the situation.

One object of the present invention is to control the frequency of explicitly requesting the user equipment to report the CQI appropriately.

Means for Solving the Problem

A base station apparatus includes a scheduler configured to schedule assignment of radio resources based on a scheduling coefficient for one or more user equipments, a control signal generation unit configured to generate a control signal including reporting indication information for indicating whether the user equipment is to report downlink channel state information and scheduling grant information for indicating the scheduled assignment of the radio resources, and a transmitting unit configured to transmit the control signal in a downlink. A cumulative value is calculated for each of the user equipments. The reporting indication information transmitted to the user equipment, whose cumulative value reaches a predefined value, indicates that the user equipment is to report the downlink channel state information. The cumulative value is updated if the scheduling coefficient satisfies a predefined condition.

Advantage of the Invention

According to the present invention, it is possible to control the frequency of explicitly requesting the user equipment to report the CQI appropriately.

BRIEF DESCRIPTION OF DRAWINGS

FIG. 6 schematically illustrates differences between increasing cumulative values;

DETAILED DESCRIPTION OF EMBODIMENTS

According to one aspect of the present invention, it is determined whether to request to report the CQI depending on whether a cumulative value reaches a predefined value. Accordingly, the CQI can be reported to a user equipment with an appropriate frequency depending on respective ones of crowded and non-crowded situations.

When a downlink shared channel is transmitted to the user equipment, the cumulative value may be updated.

The cumulative value may be updated upon a ranking of a scheduling coefficient of the user equipment falling within a predefined number. This is preferred from the viewpoint of not only modification of the CQI reporting frequency depending on the respective ones of crowded and non-crowded situations but also appropriate adjustment of the CQI reporting timing for data occurring in a burst manner.

Upon reaching a predefined value, the cumulative value is reset before the next scheduling.

The scheduling coefficient of the user equipment may be proportional to ratio between an average transmission rate and an instantaneous transmission rate for the user equipment.

For convenience, the present invention is described in separation of some items, but the separation is not essential to the present invention, and contents described in two or more items may be combined as needed (if appropriate). Although exemplary specific numeral values are used in the description in order to facilitate understanding of the present invention, unless specifically stated otherwise, these numeral values are simply illustrative, and any other appropriate value may be used.

EMBODIMENT 1

[System]

Figure 1:
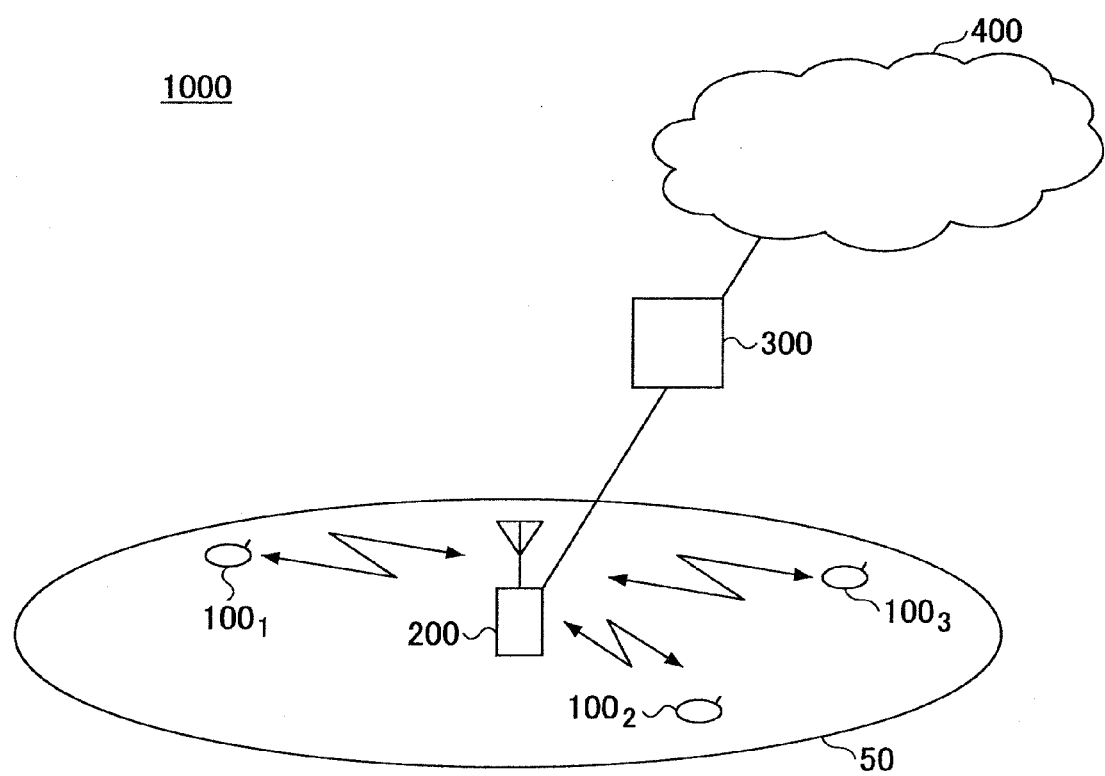
FIG. 1 illustrates a schematic view of a mobile communication system.

FIG. 1 illustrates a mobile communication system using a base station apparatus according to one embodiment of the present invention. A mobile communication system 1000 may be Evolved UTRA and UTRAN applied system, an IMT advanced system or others, for example. The Evolved-UTRA and UTRAN may be referred to as LTE (Long Term Evolution) or Super 3G. The present system includes a base station apparatus eNB (eNode B) 200 and multiple user equipments (UEs) $100_n$ ($100_1$, $100_2$, $100_3$, ..., $100_n$ where n is a positive integer). The base station apparatus 200 is connected to an upper station such as an access gateway apparatus 300, and the access gateway apparatus 300 is connected to a core network 400. The user equipment $100_n$ communicates with the base station apparatus 200 in a cell 50 in accordance with the Evolved UTRA and UTRAN. Each user equipment ($100_1$, $100_2$, $100_3$, ..., $100_n$) is any apparatus wirelessly communicating with the base station apparatus and includes not only a mobile terminal but also a fixed terminal. The access gateway apparatus may be referred to as a MME/SGW (Mobility Management Entity/Serving Gateway).

In the mobile communication system 1000, OFDMA (Orthogonal Frequency Division Multiplexing Access) and SC-FDMA (Single Carrier-Frequency Division Multiplexing Access) are applied as downlink and uplink radio access schemes, respectively. The OFDMA is a multi-carrier transmission scheme where a frequency band is segmented into multiple smaller frequency bands (subcarriers) and data is mapped to the individual subcarriers for communications. The SC-FDMA is a single-carrier transmission scheme where a frequency band is segmented for individual terminals and the multiple terminals use different frequency bands for reduction in inter-terminal interference. Note that it is not essential to the present invention to utilize these radio access schemes and any other appropriate radio access technology may be utilized. For example, a multi-carrier scheme may be utilized in uplinks.

[Communication Channel]

Next, communication channels for use in the present system are outlined. For downlinks, a PDSCH (Physical Downlink Shared Channel) shared among the user equipments $100_n$ and a PDCCH (Physical Downlink Control Channel) are used. In the downlinks, user information and transport format information on uplink shared channels, user information and transport format information on downlink shared channels, acknowledgement information on the uplink shared channels and others are transmitted in the PDCCH. Also, user data is transmitted in the PDSCH. A transport channel corresponding to the user data is a DL-SCH (Downlink-Shared Channel).

For uplinks, a PUSCH (Physical Uplink Shared Channel) shared among the user equipments $100_n$ and a control channel are used. Note that the control channel may include two types of channels, a channel time-multiplexed with the PUSCH and a channel frequency-multiplexed with the PUSCH. The control channel frequency-multiplexed with the PUSCH is referred to as a PUCCH (Physical Uplink Control Channel). The PUCCH is periodically reserved beforehand so that individual user equipments can transmit certain control information reliably. Specifically, the certain control information may be downlink quality information CQI, acknowledgement information (ACK/NACK) for downlink shared channels and others. The CQI is used for scheduling the downlink shared channels and/or for AMC (Adaptive Modulation and Coding). A transport channel corresponding to uplink user data is an UL-SCH (Uplink-Shared Channel).

In this embodiment, a logical channel corresponds to a radio bearer, for example. Also, a priority class corresponds to a degree of priority, for example.

[First Exemplary Operation]

Figure 2:
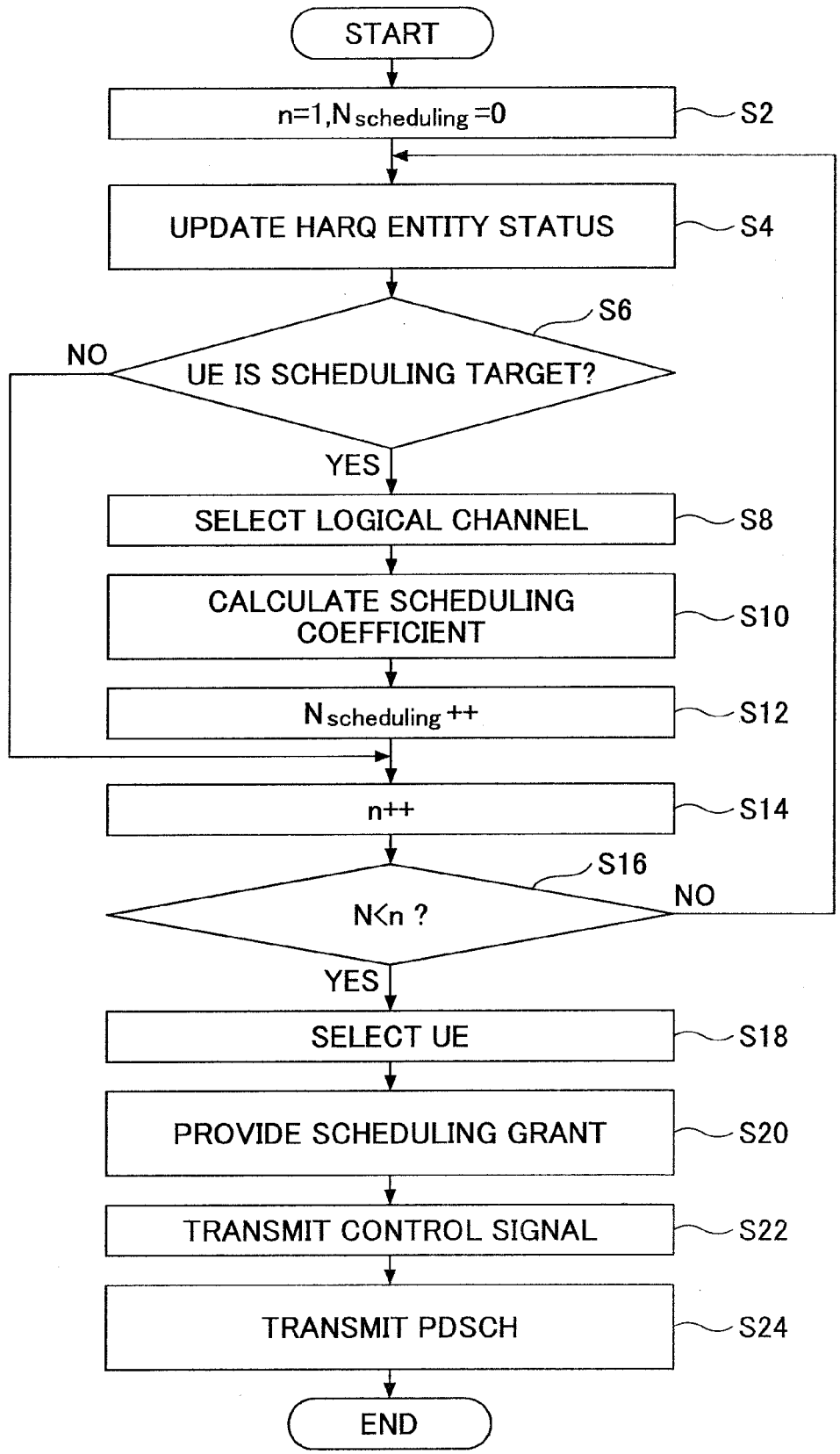
FIG. 2 is a flowchart illustrating an exemplary operation of a base station apparatus according to one embodiment of the present invention.

FIG. 2 illustrates an exemplary operation of a base station apparatus. Generally, this flow relates to a transmission procedure of downlink MAC data. Before the flow starts, the base station apparatus 200 sets the maximum multiplexing number $N_{DLMAX}$ for the downlink MAC data. The scheduling is conducted for each subframe, and the maximum multiplexing number $N_{DLMAX}$ corresponds to the maximum number of users that can be multiplexed in one subframe. This scheduling may be called dynamic scheduling in distinction from persistent scheduling. The maximum multiplexing number may be indicated via an external interface (I/F). In addition to the maximum multiplexing number, the numbers of paging channels (PCHs), RACH (Random Access Channel) responses and others may be comprehended, but their descriptions are omitted for simplicity.

The base station apparatus 200 performs the operation illustrated in FIG. 2 on all UEs being in an active state, for example, on all UEs being in an RRC (Radio Resource Control) connection state.

At step S2, parameters n and $N_{scheduling}$ are initialized as n=1 and $N_{scheduling}$=0 where n is an index for specifying a certain user equipment and is set to 1, . . . , N (N is a positive integer). $N_{scheduling}$ indicates the number of user equipments (UEs) for which calculation of the scheduling coefficients have been completed as described below.

At step S4, a HARQ entity status is updated (Renewal of HARQ Entity Status). If ACK is received as acknowledgement information to the downlink, shared channel from a target user equipment (UE), a HARQ process for the shared channel is released. A process reaching the maximum number of retransmissions is also released, and user data in the process is discarded. The maximum number of retransmissions may be set via an external input interface (I/F) for each priority class. Also, the maximum number of retransmissions of multiple logical channels multiplexed MAC-PDU may be set to the maximum number of retransmissions of a logical channel of the priority class having the highest priority.

At step S6, it is determined whether a user equipment of interest is a user equipment to be scheduled. User equipments not targeted to the scheduling correspond to any of (a) to (f) as follows. Radio resources are not assigned (scheduled) to the user equipments that are valid for any of (a) to (f). This is because even if the radio resources are assigned to the user equipments, the radio resources cannot be usefully utilized.

(a) User equipment such that if downlink radio resources are assigned to the user equipment, a subframe for transmitting a downlink shared channel overlaps with a measurement gap when the user equipment conducts different frequency measurement (to measure cells having different frequencies);

(b) User equipment such that a time frame for transmitting acknowledgement information for a downlink shared channel overlaps with a measurement gap when the user equipment conducts different frequency measurement;

(c) User equipment being in sleep state in discontinuous reception;

(d) User equipment being out of synchronization;

(e) User equipment targeted to persistent scheduling;

(f) User equipment such that data to be transmitted to the user equipment (including not only new packets but also retransmission packets) has not been buffered in a transmission buffer.

The measurement gap for the different frequency measurement in (a) and (b) may be a time interval when different RAT measurement (to measure cells having different RATs (Radio Access Technologies)) is conducted. The RAT commonly represents a mobile communication system such as WCDMA, LTE and GSM.

If the user equipment of interest is not valid for any of them, the flow proceeds to step S8. In other words, the base station apparatus conducts the scheduling for user equipments UEs which are not determined to be precluded from the scheduling targets, selects a user equipment UE to transmit the shared channel out of the user equipments UEs, and transmits the downlink shared channel to the UE.

At step S8, an appropriate logical channel is extracted from a downlink transmission buffer for the user equipment determined as the scheduling target. The extracted logical channel is generally the logical channel having the highest priority for the user equipment. More specifically, the highest priority logical channel is selected among logical channels for transmittable data based on selection logic as follows.

Selection logic 1: The logical channel having the highest priority becomes the highest priority logical channel.

Selection logic 2: If several logical channels satisfy Selection logic 1, one of the logical channels for retransmission data becomes the highest priority logical channel.

Selection logic 3: If several logical channels satisfy Selection logic 2, a DCCH (Dedicated Control Channel) becomes the highest priority logical channel if any. If the DCCH does not exist, any of the logical channels may become the highest priority logical channel (it may be selected randomly or in ascending order).

In the case where these determination criteria are applied, new data for higher priority logical channels are selected in priority over retransmission data for lower priority logical channels.

At step S10, a scheduling coefficient is calculated to transmit the logical channel selected as the highest priority logical channel in downlinks. In other words, if there are several logical channels to be transmitted to a certain user equipment, the scheduling coefficient is calculated for the highest priority logical channel rather than for all the logical channels. As a result, processing load of the base station apparatus can be reduced.

In the above-mentioned embodiment, the highest priority logical channel is selected among the several logical channels prepared for the user equipment, and the scheduling coefficient is calculated for the highest priority logical channel. Alternatively, the scheduling coefficient may be calculated for all the logical channels prepared for the user equipment.

The scheduling and the scheduling coefficient may be provided in any appropriate manner known in the technical field. In this embodiment, the scheduling is conducted based on Proportional Fairness method. In this method, the scheduling coefficient $C_{n,k}$ for the k-th logical channel for the n-th user equipment is equal to an amount proportional to the ratio between an average data rate $AR_{n,k}$ and an instantaneous data rate $R_{n,k}$. (The proportional constant is determined in accordance with any method known in the technical field.)

$$C_{n,k} \propto R_{n,k}/AR_{n,k},$$

where the instantaneous data rate $R_{n,k}$ may be calculated from radio quality information (CQI) reported from the user equipment.

Also, the average data rate $AR_{n,k}$ is defined as follows, $$AR_{n,k}(TTI) = \delta_{n,k} \times AR_{n,k}(TTI-1) + (1-\delta_{n,k}) \times r_{n,k},$$

where "TTI" represents a subframe, and "TTI–1" represents a subframe immediately preceding the TTI.

$\delta_{n,k}$ represents a forgetting factor and is calculated as follows, $$\delta_{n,k} = \min(1 - 1/N_{n,k}, \delta'_{PCn,k}),$$

where $\delta'_{PCn,k}$ represents a convergence value for the forgetting factor. The average data rate $AR_{n,k}$ is updated for each subframe where data to be transmitted is buffered in a transmission buffer for the logical channel #k in the base station apparatus. The parameter $r_{n,k}$ is calculated as the size of transmitted MAC service data unit (MAC SDU). In other words, the average data rate $AR_{n,k}$ is updated for each update opportunity by using any $r_{n,k}$ as follows.

1. For a PDSCH assigned user equipment UE, $r_{n,k}$ is set to the size of transmitted MAC SDU.
2. For a user equipment to which the PDSCH is not assigned, $r_{n,k}$ is set to 0.

As can be understood from the $C_{n,k}$ and $AR_{n,k}$ formulae, if the PDSCH is assigned (Case 1), $AR_{n,k}$ is updated to be greater (it increases by $(1-\delta_{n,k}) \times r_{n,k}$) and the scheduling coefficient $C_{n,k}$ derived from the updated $AR_{n,k}$ decreases. As a result, there is a lower likelihood that the PDSCH may be assigned in the next scheduling. On the other hand, if the PDSCH is not assigned (Case 2), there is no contribution of the amount $(1-\delta_{n,k}) \times r_{n,k}$. Thus, $AR_{n,k}$ is updated to be smaller, and the scheduling coefficient $C_{n,k}$ derived from the updated $AR_{n,k}$ increases. As a result, there is a higher likelihood that the PDSCH may be assigned in the next scheduling.

At step S12, $N_{scheduling}$ indicative of the number of user equipments UEs, whose scheduling coefficient $C_{n,k}$ has been calculated, is incremented by one.

At step S14, the index n indicative of the user equipment UE is incremented by one. Also if the user equipment UE is not targeted to the scheduling at step S6, the flow proceeds to step S14.

At step S16, it is determined whether n is less than or equal to N. N is an upper limit of n and has been discussed in conjunction with step S2. As a result, $n \leq N$ and $N_{scheduling} \leq N$ in an effective numeral range. If n is increased at step S14 but is not less than N, the flow returns to step S4 to repeat the above-mentioned operation for a different user equipment. If n is increased at step S14 and exceeds N, the flow proceeds to step S18.

At step S18, $N_{scheduling}$ scheduling coefficients are used to select user equipments to which a downlink shared channel is to be assigned in the next subframe.

First, the number of radio resources assigned users (user multiplexing number), that is, the number $N_{DL-SCH}$ of user equipments UEs to which the downlink shared channel is transmitted, is provided in accordance with the formula $$N_{DL-SCH} = \min(N_{scheduling}, N_{DLMAX} - N_{PCH} - N_{RACHres} - N_{D-BCH} - N_{RACHm4} - N_{MCH}).$$

As stated above, $N_{scheduling}$ indicates the number of user equipments whose scheduling coefficients have been calculated. $N_{DLMAX}$ indicates the maximum multiplexing number. $N_{PCH}$ indicates the number of paging channels. $N_{RACHres}$ indicates the number of channels for RACH response. $N_{D-BCH}$ indicates the number of dynamic broadcast channels. $N_{RACHm4}$ indicates the number of channels for message 4 in random access procedure. $N_{MCH}$ indicates the number of MBMS channels. If $N_{DL-SCH} < 0$ in the above formula, transmission operations for the subframe is prohibited in the order of the RACH message 4, the RACH response, the MBMS channel (MCH), the paging channel (PCH) and the dynamic broadcast channel (D-BCH). In this manner, it is possible to avoid transmitting the channels exceeding the maximum multiplexing number.

Next, $N_{DL-SCH}$ user equipments are selected for each scheduling priority group of the highest priority logical channels. Naturally, the user equipments are selected in the descending order of the scheduling coefficients. The scheduling priority group means a group to which a priority is provided in the scheduling, and the individual logical channels belong to one of the scheduling priority groups.

As one example, assuming that three groups "High", "Middle" and "Low" are provided, the user equipments UEs are selected in the order High ($1^{st}$), High (2nd), . . . , Middle ($1^{st}$), Middle ($2^{nd}$), . . . , Low ($1^{st}$), Low ($2^{nd}$), . . . .

If the user equipments UEs have control information for MAC layer to be transmitted in a certain subframe, the scheduling priority group is set to "High" regardless of the scheduling priority group of the highest priority logical channels. In other words, the base station apparatus conducts the scheduling under assumption that the user equipments UEs indicated in the control information for the MAC layer to be transmitted in that subframe belong to the scheduling priority group of a high priority.

In the above-mentioned example, the three scheduling priority groups "High", "Middle" and "Low" are provided. However, four or more scheduling priority groups as needed may be provided, or two or less scheduling priority groups may be provided.

At step S20, downlink scheduling grant information is provided to the user equipment selected in the above manner. When the user equipment is selected, radio resources assigned to the user equipment are determined together. The radio resources are identified in terms of resource blocks, data transmission formats, power and so on. The data transmission format may be represented in a data modulation scheme and a channel coding rate or in a data modulation scheme and a data size. The data transmission format is identified by a number (MCS number) used in the AMC method. A scheduler in the base station apparatus conducts scheduling for downlinks as well as for uplinks. Thus, the scheduler provides the downlink scheduling grant information as well as the uplink scheduling grant information.

At step S22, a downlink control signal including at least the scheduling grant is provided and transmitted in downlinks. The downlink control signal is typically a downlink L1/L2 control channel (PDCCH), but any appropriate lower layer control signal for reporting the scheduling information to the user equipment may be used.

Also at step S24, the PDSCH corresponding to the downlink control signal at step S22 is transmitted. Then, the flow ends.

In this embodiment, in addition to the assignment information of the uplink radio resources, a CQI request bit (report indication information) is provided. The CQI request bit identifies whether to report the CQI in a PUSCH upon the PUSCH is allowed to be transmitted to the user equipment. For example, if the CQI request bit is set to "1", the CQI together with user traffic data is transmitted to the base station apparatus in the PUSCH allowed for transmission. For the CQI having a large data size, only the CQI may be transmitted in the PUSCH allowed for transmission. Also, if the CQI request bit is set to "0", for example, the user traffic data is transmitted to the base station apparatus in the PUSCH allowed for transmission. The CQI request bit may be defined as a portion of the uplink scheduling grant information or may be provided as an information item different from the uplink scheduling grant information. Anyway, it is sufficient to explicitly inform the user equipment whether it should report the CQI to the base station apparatus, using the PUSCH allowed by the base station apparatus.

Figure 3:
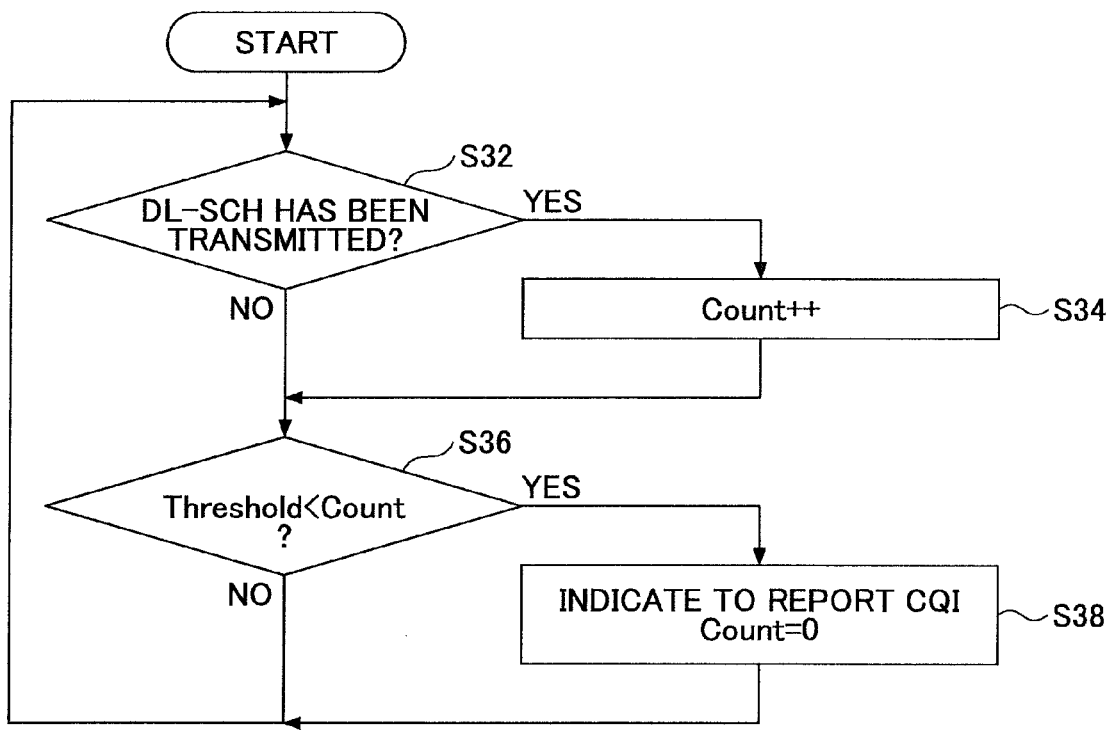
FIG. 3 is a flowchart of a first exemplary operation of a base station apparatus.

FIG. 3 is a flowchart illustrating an exemplary operation for adjusting the CQI reporting frequency appropriately according to the present embodiment. Typically, this flow is conducted for every user equipment (n=1, ..., N) as considered in conjunction with FIG. 2 but may be conducted for only the user equipments that have not been precluded at step S6 in FIG. 2 ($N_{scheduling}$ user equipments to be scheduled).

At step S32 in FIG. 3, it is determined whether a downlink shared channel has been transmitted to the user equipment of interest. More specifically, it is determined whether a transport channel referred to as the DL-SCH destined for the user equipment has been actually transmitted to the user equipment in the physical channel referred to as the PDSCH. This determination may be generally made in parallel with step S22 in FIG. 2, but it may be made at step S20 or S18. If the determination is made prior to step S22, it is determined at step S32 in FIG. 3 whether the DL-SCH is to be actually transmitted instead of whether the DL-SCH has been actually transmitted. If the DL-SCH has been actually transmitted or if the DL-SCH is to be actually transmitted, the flow proceeds to step S34. At step S34, the cumulative value enumerated for each user equipment of interest (referred to as "Count" in FIG. 3) is incremented by one.

At step S36, the cumulative value (Count) is compared with a predefined threshold (referred to as "Threshold"). While the cumulative value is counted for each user equipment, the threshold is common to all user equipments in principle. (However, it is technically possible to set different thresholds between a certain user and a different user.) As one example, the threshold may be set to "4". For the user equipment to which the DL-SCH has been transmitted or is to be transmitted in the current scheduling (in YES at step S32), the resulting cumulative value incremented by one is compared with the threshold. For the user equipment to which the DL-SCH has not been transmitted in the current scheduling (in NO at step S32), the cumulative value without increment is compared with the threshold. As a result of the comparison, if the cumulative value (Count) is greater than the threshold (Threshold) (YES), the flow proceeds to step S38.

At step S38, the CQI request bit is set to a predefined value (e.g., "1"). The CQI request bit indicates whether the CQI is to be reported to the base station apparatus in the PUSCH allowed by the base station apparatus to the user equipment. The CQI request bit set to the predefined value is transmitted to the user equipment as a portion of the uplink scheduling grant information or separately. After it is determined that the CQI request bit is to be set to the predefined value ("1" in this example), the cumulative value is reset to zero (Count=0). Subsequently, the flow returns to step S32 where the above-mentioned operation is repeated for a different user.

As a result of the comparisons at step S36, if the cumulative value (Count) is less than or equal to the threshold (Threshold) (NO), the flow returns to step S32 where the above-mentioned operation is repeated for a different user. Although not explicitly described in the illustrated flow, if step S36 is NO and the PUSCH is allowed to be transmitted to the user equipment, the CQI request bit is set to a different predefined value (e.g., "0"). The CQI request bit set to the different predefined value is also transmitted to the user equipment as a portion of the uplink scheduling grant information or separately. Thus, independently of the determination result at step S36, when the user equipment receives the uplink scheduling grant information, the user equipment can easily determine whether to transmit the CQI or the user traffic data in the allowed PUSCH by checking the CQI request bit.

Although the control method as illustrated in FIG. 3 has been applied to every user equipment considered in FIG. 2 (n=1, N), the control method as illustrated in FIG. 3 may be instead applied to slowly moving ones of the user equipments. Alternatively, although the control method as illustrated in FIG. 3 has been applied to every user equipment considered in FIG. 2 (n=1, ..., N), the control method as illustrated in FIG. 3 may be instead applied to slowly moving ones of the user equipments that have not been precluded at step S6 in FIG. 2 ($N_{scheduling}$ user equipments to be scheduled).

The slowly moving user equipment may be the user equipment having a traveling speed of less than or equal to 3 km/h, for example. The traveling speed may be estimated by the user equipment or the base station apparatus. More specifically, the traveling speed may be found by the user equipment based on data obtained from GPS and reported to the base station apparatus.

Alternatively, the slow movement state may be rephrased with the state where the radio propagation environment slowly changes or the state where the fading frequency is low. For example, the slowly moving user equipment may be the user equipment having a fading frequency less than or equal to 5 Hz. Here, the fading frequency may be estimated by the user equipment or the base station apparatus. More specifically, the traveling speed may be found by the user equipment based on temporal variation or temporal correlation of downlink reference signals, for example, and the derived fading frequency may be reported to the base station apparatus. Alternatively, the fading frequency may be found by the base station apparatus based on temporal variations or temporal correlation of uplink reference signals, for example. Here, the uplink reference signal may be a sounding reference signal or a demodulation reference signal in the PUSCH or the PUCCH.

Alternatively, the base station apparatus may determine whether the user equipment is in the slow movement state by determining whether the temporal correlation of the reference signals transmitted from the user equipment is large or not. In other words, if the temporal correlation of the reference signals transmitted from the user equipment is large, the base station apparatus may determine that the user equipment is in the slow movement state, and otherwise, the base station apparatus may determine that the user equipment is not in the slow movement state. The large temporal correlation means that the radio propagation environment slightly changes and accordingly the user equipment is in the slow movement state.

Some effects produced by applying the control method as illustrated in FIG. 3 to only the slowly moving user equipments are described below.

In the case where the user equipment is in the fast movement state, generally the radio propagation environment significantly changes, and even if the scheduling operation and/or the transmission format determination operation are conducted based on the CQI reported from the user equipment, accurate control cannot be achieved. In other words, in the case where the user equipment is in the fast movement state, there is a difference between the radio propagation environment at the CQI calculation timing and the radio propagation environment at the actual transmission timing of the PUSCH, and thus the accurate control cannot be achieved. This means that the fast moving user equipment does not have to be caused to report the CQI to the base station apparatus in the PUSCH so frequently or to measure the CQI for each resource of a predefined magnitude in the frequency domain and report the measure CQIs to the base station apparatus in the PUSCH. In other words, this means that it is sufficient to cause the fast moving user equipment to report only the CQI averaged in the frequency domain to the base station apparatus at a larger cycle. Accordingly, radio resources consumed in uplinks can be reduced by applying the control method as illustrated in FIG. 3 to only the slowly moving user equipments required to report the CQI.

Although the control method as illustrated in FIG. 3 has been applied to every user equipment considered in FIG. 2 (n=1, ..., N) in the above example, the control method as illustrated in FIG. 3 may be instead applied to only ones of all the user equipments having pathloss less than or equal to a predefined threshold. Alternatively, although the control method as illustrated in FIG. 3 has been applied to every user equipment considered in FIG. 2 (n=1, N) in the above example, the control method as illustrated in FIG. 3 may be applied to only user equipments having pathloss less than or equal to the predefined threshold among the user equipments that have not been precluded at step S6 in FIG. 2 ($N_{scheduling}$ user equipments to be scheduled).

The user equipment having pathloss less than or equal to the predefined threshold may be the user equipment having pathloss less than or equal to 100 dB, for example. The numeral value "100 dB" is simply illustrative, and any other value may be used.

The pathloss corresponds to pathloss between the user equipment and the base station apparatus and may be calculated from power headroom reported from the user equipment. More specifically, the pathloss may be calculated based on $$Pathloss = \frac{P_{max} - PH - 10 \cdot \log_{10}(M_{PUSCH}) - P_{O\_PUSCH} - \Delta_{TF}(TF(i)) - f(i)}{\alpha}$$

where $P_{max}$ is the maximum transmit power of the UE, PH is the power headroom reported from the UE, $M_{PUSCH}$ is the transmission bandwidth of the PUSCH corresponding to the above PH, f(i) is a cumulative value of TPC command expected for the UE to hold, $\alpha$ is a parameter indicated by NW, $P_{O\_PUSCH}$ is a parameter indicated by the NW, and $\Delta_{TF}(TF(i))$ is a parameter indicated by the NW. The above formula is based on the assumption where the power headroom is calculated based on the pathloss calculated within the user equipment. In other words, in the case where the power headroom is calculated based on the pathloss and transmitted from the user equipment to the base station apparatus, the base station apparatus can calculate the pathloss from the power headroom by converting the formula for calculating the pathloss from the power headroom. Also in the case where instead of the power headroom, the transmit power itself is reported from the user equipment to the base station apparatus and calculated from the pathloss, the pathloss can be calculated in a similar operation.

Alternatively, the pathloss may be calculated based on the difference between the transmit power of uplink signals from the user equipment and reception power of the uplink signal at the base station apparatus.

Here, the transmit power of the uplink signals may be calculated from the power headroom (PH). In other words, the transmit power of the uplink signals may be calculated based on "the maximum transmit power of the UE–PH".

Alternatively, the pathloss may be a value reported from the user equipment.

Some effects produced by applying the control method as illustrated in FIG. 3 to only the user equipments having the pathloss less than or equal to a predefined threshold are described below.

In the case where the user equipment has large pathloss, the estimation accuracy of the CQI may not be generally high, and even if the scheduling operations and the transmission format determination operation are conducted based on the CQI reported from the user equipment, the accurate control cannot be fulfilled. This means that the user equipment having large pathloss does not have to be caused to report the CQI to the base station apparatus in the PUSCH frequently or to measure the CQI for each resource having a predefined magnitude in the frequency domain and report the measured CQIs to the base station apparatus in the PUSCH. In other words, it means that it is sufficient to cause the user equipment having the large pathloss to report the CQI averaged in the frequency domain at a longer cycle. Accordingly, a smaller amount of radio resources can be consumed in uplinks by applying the control method as illustrated in FIG. 3 to only the user equipment having small pathloss and required to report the CQI.

Although the control method as illustrated in FIG. 3 has been applied to all the user equipments as considered in FIG. 2 (n=1, ..., N) in the above example, the control method may be instead applied to only slowly moving user equipments having pathloss less than or equal to a predefined threshold among all the user equipments as consider in FIG. 2 (n=1, ..., N). Alternatively, although the control method as illustrated in FIG. 3 has been applied to all the user equipments as considered in FIG. 2 (n=1, ..., N) in the above example, the control method may be instead applied to only slowly moving user equipments having pathloss less than or equal to a predefined threshold among user equipments that have not been precluded at step S6 ($N_{scheduling}$ user equipments to be scheduled).

Figure 4:
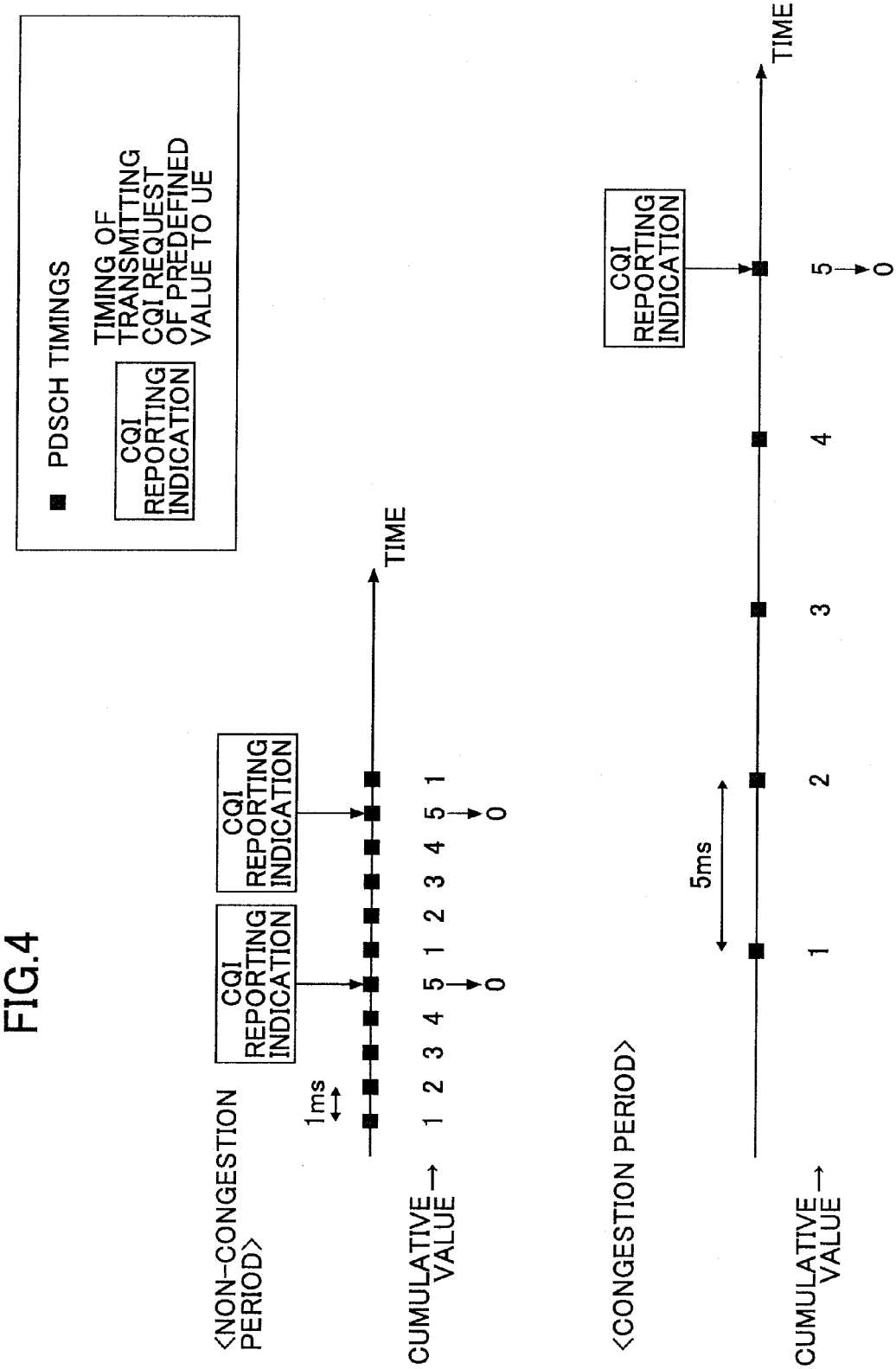
FIG. 4 schematically illustrates effects of the present embodiment.

FIG. 4 schematically illustrates the effects of the present embodiment. In the illustrated example, it is assumed that the PDSCH is assigned to a certain user equipment for which many DL-SCHs are buffered in a transmission buffer. It is assumed that the base station apparatus performs scheduling for each subframe of 1 ms, for example. If the system is not congested and the channel state associated with the user equipment is not so poor, PDSCH resources may be frequently assigned to the user equipment. As illustrated as "non-congestion period", the PDSCH is transmitted to the user equipment in every subframe. In this case, it is desirable that the base station apparatus knows the up-to-date downlink channel state accurately. It is assumed that the threshold (Threshold) for the cumulative value (Count) described in conjunction with FIG. 3 is set to "4". According to the flow in FIG. 3, the cumulative value is incremented for each transmission of the DL-SCH, and thus the cumulative value would be incremented for each subframe of 1 ms in the "non-congestion period" in FIG. 4. If the cumulative value exceeds the threshold "4", the CQI request is set to a predefined value ("1" in the above example), and the user equipment is requested to report the CQI. Since the CQI request of the predefined value is transmitted to the user equipment for each 5 ms in the case of "non-congestion period" in FIG. 4, the user equipment would report the CQI for each 5 ms.

On the other hand, if the system is congested, the PDSCH cannot be assigned to the user equipment frequently compared to the non-congestion period. As illustrated in "congestion period", the PDSCH is transmitted to the user equipment only for every five subframes (for each 5 ms). Accordingly, the cumulative value slowly increases, and the CQI request of the predefined value would be transmitted to the user equipment after passage of 20 ms in the illustrated example. If the system is congested, uplink resource consumption can be reduced by causing the user equipment to report the CQI infrequently (to report the CQI with a lower frequency). The saved resources can be used for the purpose other than the CQI reporting.

[Second Exemplary Operation]

Figure 5:
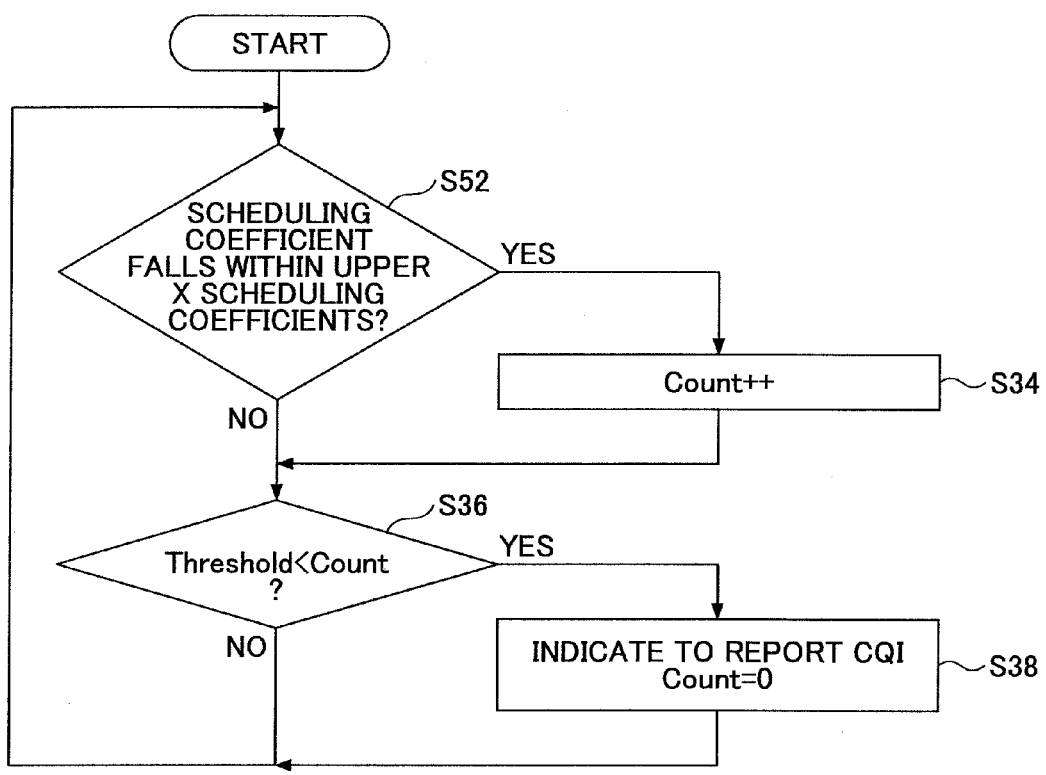
FIG. 5 is a flowchart of a second exemplary operation of a base station apparatus.

FIG. 5 is a flowchart illustrating another exemplary operation for achieving appropriate CQI reporting frequency. This flowchart is generally similar to that in FIG. 3 except that step S52 is performed instead of step S32. At step S52, it is determined how satisfactory the scheduling coefficient $C_{n,k}$ for the user equipment of interest (which has been calculated at step S10 in FIG. 2) is among $N_{scheduling}$ scheduling coefficients. As illustrated in FIG. 2, the $N_{scheduling}$ user equipments are to be scheduled, and it is determined whether to transmit the PDSCH (DL-SCH) actually based on their scheduling coefficients (step S18 in FIG. 2). At step S52 in FIG. 5, it is determined whether a ranking of the scheduling coefficient of the user equipment falls within a predefined number in terms of the scheduling coefficient values (within X upper scheduling coefficients) separately from determination as to whether to actually transmit the DL-SCH to the user equipment. For example, it is determined whether the ranking of the scheduling coefficient of the user equipment falls within upper ten in terms of the scheduling coefficient values among $N_{scheduling}$ (=20) user equipments. The scheduling coefficients of the best three user equipments may be satisfactory to transmit the DL-SCH in practice, for example. If the ranking of the scheduling coefficient falls within the upper X in terms of the scheduling coefficient values, the flow proceeds to step S34, and otherwise, the flow proceeds to step S36.

The operations at steps S34, S36 and S38 have been already described, and descriptions thereof are omitted. In this exemplary operation, even in the case where the scheduling coefficient is not satisfactory for the actual DL-SCH transmission, if the ranking of the scheduling coefficient falls within a relatively satisfactory range, the cumulative value is incremented at step S34. Accordingly, the cumulative value is incremented in not only the case where the DL-SCH has been actually assigned but also the time point when the possibility of the assignment occurs, which can increase the CQI reporting frequency beforehand.

In the above-mentioned example, the X value may be defined as an absolute value or a relative value. If the X value is defined as the absolute value, it is defined as falling within the upper 10 in terms of scheduling coefficient values as mentioned above. On the other hand, if the X value is defined as the relative value, it may be defined as falling within upper 20% of the $N_{scheduling}$ user equipments, for example. Alternatively, it may be defined as falling within the upper 30% of RRC connected user equipments.

Although the control method as illustrated in FIG. 5 has been applied to every user equipment as considered in FIG. 2 (n=1, ..., N) in the above example, the control method as illustrated in FIG. 5 may be instead applied to slowly moving user equipments in all the user equipments as considered in FIG. 2 (n=1, ..., N). Alternatively, although control method as illustrated in FIG. 5 has been applied to every user equipment as considered in FIG. 2 (n=1, ..., N) in the above example, the control method as illustrated in FIG. 5 may be instead applied to slowly moving user equipments in user equipments that have not been precluded at step S6 in FIG. 2 ($N_{scheduling}$ user equipments to be scheduled).

Here, the slowly moving user equipment may be a user equipment having a traveling speed less than or equal to 3 km/h, for example. The traveling speed may be estimated by the user equipment or the base station apparatus. More specifically, the traveling speed may be found by the user equipment based on data obtained from GPS and be reported to the base station apparatus.

Alternatively, the slow movement state may be rephrased with a state that radio propagation environment slowly changes or a state that fading frequency is small. For example, the slowly moving user equipment may be a user equipment having a fading frequency less than or equal to 5 Hz. Here, the fading frequency may be estimated by the user equipment or the base station apparatus. More specifically, the traveling speed may be found by the user equipment based on temporal variations or temporal correlations of downlink reference signals, for example, and the derived fading frequency may be reported to the base station apparatus. Alternatively, the fading frequency may be found by the base station apparatus based on temporal variations or temporal correlations of uplink reference signals, for example. Here, the uplink reference signal may be a sounding reference signal or a demodulation reference signal in the PUSCH or the PUCCH.

Alternatively, the base station apparatus may determine whether the user equipment is in the slow movement state by determining whether the temporal correlation of the reference signal transmitted from the user equipment is high. In other words, if the temporal correlation of the reference signal transmitted from the user equipment is high, the base station apparatus may determine that the user equipment is in the slow movement state, and otherwise, the base station apparatus may determine that the user equipment is not in the slow movement state. The high temporal correlation means that the radio propagation environment slightly changes and accordingly the user equipment is in the slow movement state.

Some effects produced by applying the control method as illustrated in FIG. 5 to only the slowly moving user equipments are described below.

In the case where the user equipment is in the fast movement state, generally the radio propagation environment significantly changes, and even if the scheduling operation and the transmission format determination operation are conducted based on the CQI reported from the user equipment, the accurate control cannot be fulfilled. In other words, in the case where the user equipment is in the fast movement state, there is a difference between the radio propagation environment at the CQI calculation timing and the radio propagation environment at actual transmission timing of the PDSCH, which leads to difficulty of the accurate control. This means that there is no need for the fast moving user equipment to use the PUSCH to report the CQI to the base station apparatus frequently or measure the CQI for each resource of a predefined magnitude in the frequency domain and report the measured CQIs to the base station apparatus. In other words, it means that it is sufficient to cause the fast moving user equipment to report the CQI averaged in the frequency domain at a longer cycle. Thus, reduced radio resources can be consumed in uplinks by applying the control method as illustrated in FIG. 5 to only the slowly moving user equipment required to report the CQI.

Although the control method as illustrated in FIG. 3 has been applied to every user equipment as considered in FIG. 2 (n=1, ..., N) in the above example, the control method as illustrated in FIG. 3 may be instead applied to user equipments having pathloss less than or equal to a predefined threshold in all the user equipments as considered in FIG. 2 (n=1, ..., N). Alternatively, although the control method as illustrated in FIG. 3 has been applied to every user equipment as considered in FIG. 2 (n=1, ..., N) in the above example, the control method as illustrated in FIG. 3 may be instead applied to user equipments having pathloss less than or equal to a predefined threshold in the user equipments that have not been precluded at step S6 in FIG. 2 ($N_{scheduling}$ user equipments to be scheduled).

The user equipment having pathloss less than or equal to the predefined threshold may be the user equipment having pathloss less than or equal to 100 dB, for example. Here, the numeral value "100 dB" is simply illustrative, and any other value may be used.

The pathloss calculation method is the same as the above-mentioned one, and a description thereof is omitted.

Some effect produced by applying the control method as illustrated in FIG. 3 to only the user equipment having pathloss less than or equal to the predefined threshold.

In the case where the user equipment has large pathloss, generally the CQI estimation accuracy would be unsatisfactory, and even if the scheduling operation and the transmission format determination operation are conducted based on the CQI reported from the user equipment, the accurate control cannot be fulfilled. This means that there is no need to cause the user equipment having the large pathloss to report the CQI to the base station apparatus in the PUSCH frequently or to measure the CQI for each resource of a predefined magnitude in the frequency domain and report the measured CQIs to the base station apparatus. In other words, it means that it is sufficient to cause the user equipment having large pathloss to report the CQI averaged in the frequency domain at a longer cycle. Thus, reduced radio resources can be consumed in uplinks by applying the control method as illustrated in FIG. 3 to only user equipments having small pathloss.

Although the control method as illustrated in FIG. 3 has been applied to every user equipment as considered in FIG. 2 (n=1, . . . , N) in the above example, the control method as illustrated in FIG. 3 may be instead applied to slowly moving user equipments having pathloss less than or equal to a predefined threshold in all the user equipments as considered in FIG. 2 (n=1, . . . , N). Alternatively, although the control method as illustrated in FIG. 3 has been applied to every user equipment as considered in FIG. 2 (n=1, . . . , N) in the above example, the control method as illustrated in FIG. 3 may be instead applied to slowly moving user equipments having pathloss less than or equal to a predefined threshold in user equipments that have not been precluded at step S6 in FIG. 2 ($N_{scheduling}$ user equipments to be scheduled).

FIG. 6 illustrates differences of increases in the cumulative values between the first exemplary operation and the second exemplary operation. In descriptions set forth below with reference to the illustration, for simplification, it is assumed that a user equipment and a base station apparatus have processing delay of 0 ms in the case where the user equipment reports the CQI to the base station apparatus which in turn conducts the scheduling, the resource selection in the frequency domain and the transmission format determination based on the CQI. In the illustrated table, the first row indicates an index for identifying subframes arriving every 1 ms. The second row indicates the ranking of the scheduling coefficient for a certain user equipment among the scheduling coefficients in each subframe. For convenience, if the ranking of the certain user equipment falls within the upper third of all $N_{scheduling}$ (=20) user equipments, the DS-SCH is actually transmitted, and the cumulative value (I) for the first exemplary operation is incremented. If the ranking of the certain user equipment does not fall within the upper third but falls within the upper tenth, the cumulative value (II) for the second exemplary operation is incremented.

As stated in conjunction with step S10 in FIG. 2, in the present embodiment, the scheduling is conducted in accordance with the proportional fairness method, and the scheduling coefficient $C_{n,k}$ is proportional to the ratio between the average data rate $AR_{n,k}$ and the instantaneous data rate $R_{n,k}$, $$C_{n,k} \propto R_{n,k}/AR_{n,k},$$

where the instantaneous data rate $R_{n,k}$ may be calculated from the radio quality information (CQI) reported from the user equipment.

Here, the average data rate is defined as, $$AR_{n,k}(TTI)=\delta_{n,k} \times AR_{n,k}(TTI-1)+(1-\delta_{n,k}) \times r_{n,k},$$

where "TTI" represents a subframe, and "TTI-1" represents a subframe immediately preceding the TTI.

$\delta_{n,k}$ represents a forgetting factor, and the average data rate $AR_{n,k}$ is updated by using any $r_{n,k}$ as follows for each updating opportunity.

1. For PDSCH assigned user equipments, $r_{n,k}$ is set to the size of transmitted MAC SDU.

2. For PDSCH not assigned user equipments, $r_{n,k}$ is set to 0 ($r_{n,k}$=0).

As understood from the formulae for $C_{n,k}$ and $AR_{n,k}$ if the PDSCH is assigned (Case 1), $AR_{n,k}$ is updated to be larger, and the scheduling coefficient $C_{n,k}$ derived from the updated $AR_{n,k}$ would become smaller. For this reason, after the DL-SCH is assigned, the scheduling coefficient $C_{n,k}$ becomes poorer, and after that the ranking gradually tends to be improved. On the other hand, if the PDSCH is not assigned (Case 2), $AR_{n,k}$ is updated to be smaller, and the scheduling coefficient $C_{n,k}$ derived from the updated $AR_{n,k}$ would become larger. For this reason, if the DL-SCH is not assigned, the scheduling coefficient $C_{n,k}$ becomes better, and the ranking tends to be improved.

The above-mentioned characteristics of the scheduling coefficient is reflected to the second row in FIG. 6. The first cumulative value (I) is incremented upon actual transmission of the DL-SCH, and accordingly if the ranking of the scheduling coefficient falls within the upper third, the first cumulative value (I) is not incremented. As a result, the first cumulative value (I) is incremented only for TTI=6, 15. The second cumulative value (II) is incremented upon the ranking of the scheduling coefficient falling within the upper tenth, and accordingly the second cumulative value (II) is incremented for many subframes such as TTI=1-6, 10-15 and 18. Assuming that a threshold (Threshold) of the cumulative value is equal to "4", the user equipment is requested to report the CQI at timings TTI=5 and 13. In the illustrated example, the CQI is requested and reported at the timing TTI=5, and the DL-SCH is transmitted at the next timing TTI=6. As a result, the scheduling for TTI=6 can be performed based on the highly appropriate CQI. Similarly, the CQI is requested and reported at the timing TTI=13, and the DL-SCH is transmitted at the next timing TTI=15. As a result, the scheduling for TTI=15 can be also performed based on the highly appropriate CQI. For this reason, the second exemplary operation is advantageous over the first exemplary operation.

Figure 7:
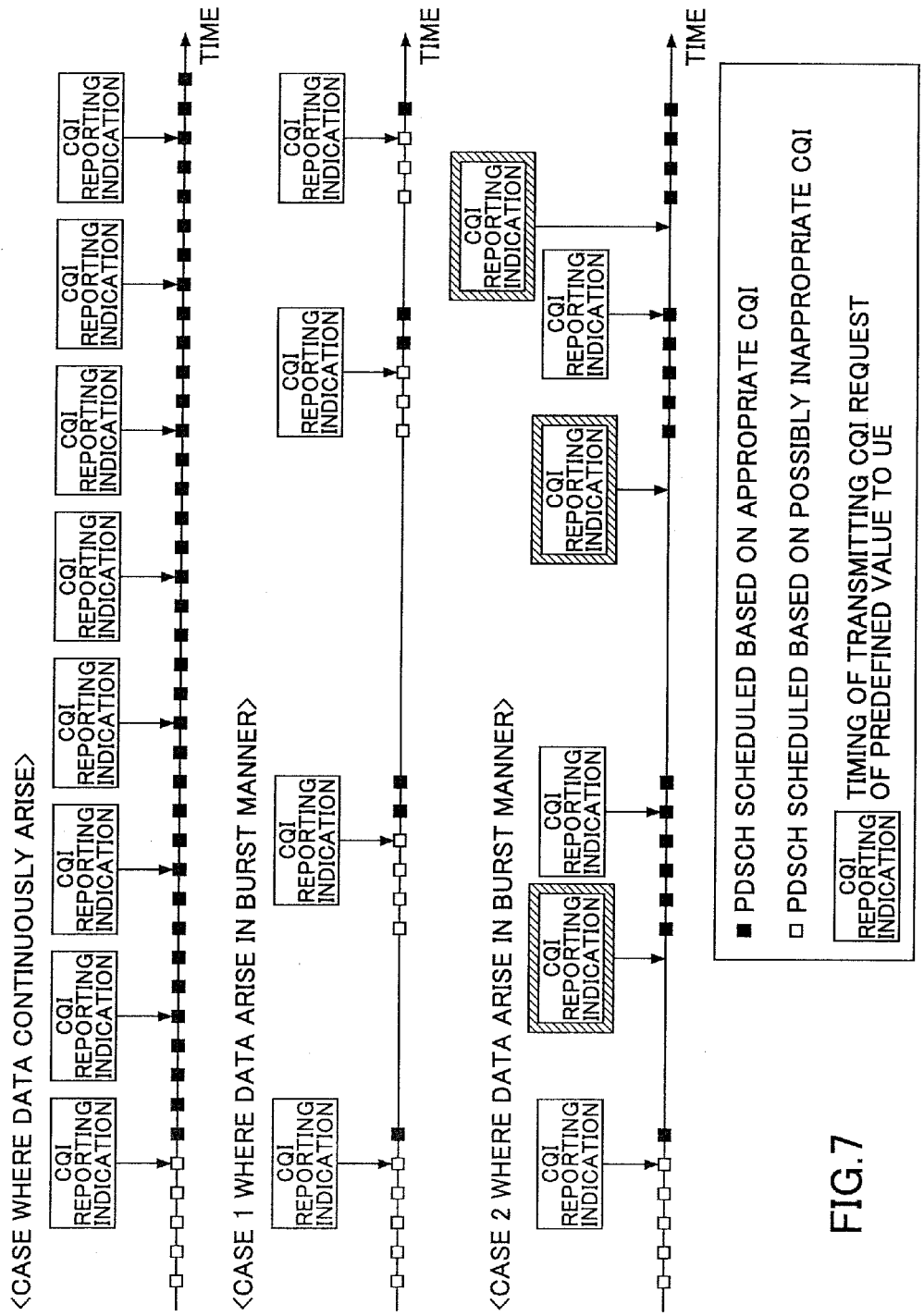
FIG. 7 schematically illustrates effects of the present embodiment.

FIG. 7 schematically illustrates an effect of the present embodiment. In descriptions as set forth below in conjunction with FIG. 7, for simplification. it is assumed that a user equipment and a base station apparatus have processing delay of 0 ms in the case where the user equipment reports the CQI to the base station apparatus which in turn conducts the scheduling, the resource selection in the frequency domain and the transmission format determination based on the CQI. Both the first exemplary operation and the second exemplary operation can achieve an appropriate frequency of the explicitly requested CQI reporting. The first exemplary operation is compared with the second exemplary operation below.

In the case where the DL-SCHs for a certain user equipment arise continuously over many subframes, there is a tendency that the DL-SCHs for the user equipment are regularly transmitted. As illustrated in the upper portion in FIG. 7, the DL-SCHs (PDSCHs) may be regularly transmitted, and accordingly the CQI may be also reported regularly. Even in a non-congested system, this tendency may exist. If the system is not congested, the DL-SCH transmission frequency and/or the CQI reporting frequency tend to increase, and if the system is congested, the DL-SCH transmission frequency and/or the CQI reporting frequency tend to decrease. In the illustration, the symbol ■ represents PDSCH timing scheduled based on a new CQI, and the symbol □ represents PDSCH timing scheduled in the situation where it is not guaranteed that the scheduling is based on the new CQI. In this case, the first exemplary operation does not differ from the second exemplary operation significantly.

As illustrated in the middle portion in FIG. 7, the case where the DL-SCHs arise in a burst manner and the first exemplary operation is conducted is considered. The burst manner means that data pieces arise discontinuously as illustrated. In the first exemplary operation, upon the DL-SCH is transmitted, the cumulative value is incremented, and if the cumulative value exceeds 4, the base station apparatus requests the user equipment to report the CQI. As a result, as illustrated, a relatively small amount of PDSCHs are scheduled based on the new CQI.

As illustrated in the lower portion in FIG. 7, thr case where the DL-SCHs arise in a burst manner and the second exemplary operation is conducted is considered. The data occurrence state is the same as the case of the middle portion. In the second exemplary operation, if the ranking of the scheduling coefficient is satisfactory enough to be within the upper tenth, the cumulative value is incremented, and upon the cumulative value exceeding 4, the base station apparatus requests the user equipment to report the CQI. Without actual transmission of the DL-SCH, the CQI reporting is requested when the DL-SCH can be easily transmitted. As illustrated in "CQI reporting indication" within the bold squares in FIG. 7, the base station apparatus may be able to request the CQI reporting near actual transmissions of the DL-SCH in the burst manner. Unlike the first exemplary operation, there is a high likelihood that such favorable operations can be conducted in the second exemplary operation.

In the above-mentioned step S38, if the PUSCH transmission timing corresponding to uplink scheduling grant information to which the CQI request bit is mapped corresponds to transmission timing of an uplink sounding reference signal for the user equipment, the base station apparatus may not set the CQI request bit to a predefined value (e.g., "1"). In this case, the CQI request bit is set to "0", and accordingly the user equipment refrains from transmitting the CQI in the PUSCH. In this case, if the uplink scheduling grant information is then transmitted to the user equipment, the CQI request bit may be set to the predefined value (e.g., "1").

Some effect of the above operation where if the PUSCH transmission timing corresponding to the uplink scheduling grant information to which the CQI request bit is mapped corresponds to the transmission timing of the uplink sounding reference signal from the user equipment, the CQI request bit is not set to the predefined value (e.g., "1") is described below.

In the case where two downlink transmit antennas are present, generally a rank indicator indicative of the rank of MIMO is transmitted from the user equipment to the base station apparatus. Here, the rank indicator mapped symbol is temporally adjacent to a symbol to which the sounding reference signal is mapped, resulting in quality degradation of the rank indicator signal. This is because the user equipment changes transmit power to decrease the quality of the signal temporally adjacent to the sounding reference signal in order to secure the quality of the sounding reference signal. As a result, where the PUSCH transmission timing corresponding to the CQI request bit mapped uplink scheduling grant information corresponds to the transmission timing of the uplink sounding reference signal from the user equipment, it is possible to prevent the quality degradation of the above rank indicator by deferring to request the CQI transmission by means of the CQI request bit. The above-mentioned operation may be applied to the case where the MIMO is applied in the relevant cell.

In the case where the user equipment has just performed random access procedure at the above-mentioned step S36, the base station apparatus may operate to always proceed to step S38.

Some effect of the operation where if the user equipment has just performed the random access procedure at the above-mentioned step S36, the base station always proceeds to step S38 is described below.

Generally, the base station apparatus does not possess the CQI reported from the user equipment immediately after the random access procedure. In this case, the base station apparatus can fulfill the scheduling operation, the frequency resource selection operation and the transmission format determination operation based on the appropriate CQI by receiving the CQI from the user equipment at earlier reception timing, which can improve system transmission characteristics.

In the above-mentioned step S38, if the number of PUSCH resource blocks corresponding to the CQI request bit mapped uplink scheduling grant information is less than or equal to a predefined value, the base station apparatus may not operate to set the CQI request bit to a predefined value (e.g., "1"). In this case, the CQI request bit is set to "0", and accordingly the user equipment refrains from transmitting the CQI in the PUSCH.

Some effect of the above operation where if the number of PUSCH resource blocks corresponding to the CQI request bit mapped uplink scheduling grant information is less than or equal to the predefined value, the base station apparatus may not operate to set the CQI request bit to the predefined value (e.g., "1") is described below.

In the case where four PUSCH resource blocks are present, for example, if the CQI is reported in the PUSCH, there is a likelihood that only the CQI may be mapped to the PUSCH. In this case, no normal data signal would be mapped to the PUSCH. In the case where the importance of the data signal is higher than that of the CQI as a result of comparison in the importance between the data signal and the CQI, the above operation can eliminate the problem that the data signal is not transmitted.

[Base Station Apparatus]

Figure 8:
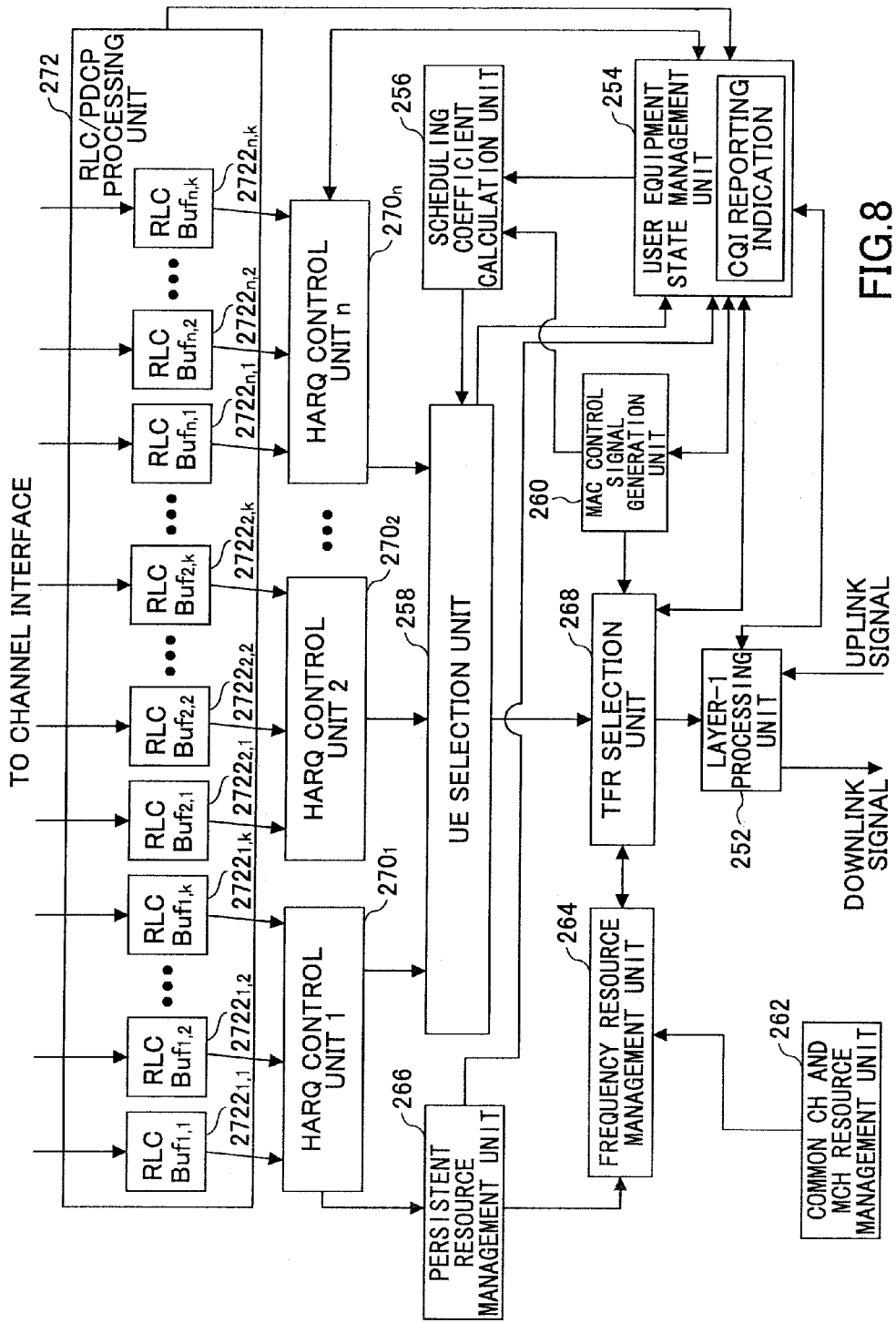
FIG. 8 is a functional block diagram illustrating a base station apparatus according to one embodiment of the present invention.

FIG. 8 is a functional block diagram illustrating a base station apparatus according to one embodiment of the present invention. In FIG. 8, a layer 1 processing unit 252, a user equipment state management unit 254, a scheduling coefficient calculation unit 256, a UE selection unit 258, a TFR selection unit 268, a MAC control signal generation unit 260, a common CH/MCH resource management unit 262, a frequency resource management unit 264, a persistent resource management unit 266, a HARQ control unit 270 ($270_1$, $270_2$, ..., $270_n$) and a RLC/PDCP processing unit 272 are provided.

The HARQ control unit 270 consists of HARQ control units $270_1$, $270_2$, ..., $270_n$ for UE#1, UE#2, ..., UE#n.

The RLC/PDCP processing unit 272 consists of RLC buffers (RLC Buf) $2722_{1,1}$ through $2722_{1,k}$ for UE#1 logical channels #1 through #k, RLC buffers (RLC Buf) $2722_{2,1}$ through $2722_{2,k}$ for UE#2 logical channels #1 through #k, ..., and RLC buffers (RLC Buf) $2722_{n,1}$ through $2722_{n,k}$ for UE#n logical channels #1 through #k.

In FIG. 8, each UE includes its own HARQ control unit, but it is not essential. A single HARQ control unit may be provided for multiple UEs. Also, a single HARQ control unit may be provided for all the UEs. The same arrangement holds for the RLC buffer ($RLCBuf_{n,k}$). It is not essential to provide each UE with the RLC buffer, and a single RLC buffer may be provided for multiple UEs. Also, a single RLC buffer may be provided for all the UEs.

The layer 1 processing unit 252 conducts layer 1 related operations. Specifically, the layer 1 processing unit 252 conducts channel coding and IFFT operations on shared channels transmitted in downlink, FFT operations and reception operations such as IDFT operations and channel decoding and so on for shared channels transmitted in uplink. Also, the layer 1 processing unit 252 conducts transmission operations for downlink scheduling grant information (control information for downlink shared channels) and uplink scheduling grant information (control information for uplink shared channels).

The layer 1 processing unit 252 conducts reception operations for control information transmitted in uplinks. The control information includes a channel quality indicator (CQI), acknowledgement information on the downlink shared channels (ACK/NACK) and so on, for example. The CQI and the acknowledgement information are transmitted to the user equipment state management unit 254. Also, the layer 1 processing unit 252 determines uplink synchronization state based on the CQI signal and the sounding reference signal transmitted in uplinks and transmits the determination to the user equipment state management unit 254.

The layer 1 processing unit 252 may estimate uplink reception timing based on the CQI signal and the sounding reference signal transmitted in uplinks. The estimated uplink reception timing is transmitted to the MAC control signal generation unit 269 via the user equipment state management unit 254, for example.

The layer 1 processing unit 252 is connected to a radio interface. More specifically, for the downlinks, a baseband signal generated by the layer 1 processing unit 252 is converted into a radio frequency band, and the converted radio frequency band is amplified at an amplifier and transmitted to UE via an antenna. On the other hand, for the uplinks, after the radio frequency signal received at the antenna is amplified at the amplifier, the resulting signal is converted into a baseband signal, which is supplied to the layer 1 processing unit 252.

The user equipment state management unit 254 manages the state of individual user equipments UEs. For example, the user equipment state management unit 254 manages the state of HARQ entity, mobility of the user equipments UEs, the state of discontinuous reception (DRX), the uplink synchronization state, application of the persistent scheduling, control of transmission of MAC control blocks, downlink transmission state, buffer state and so on. The user equipment state management unit 254 determines whether to calculate metrics for calculating the scheduling coefficient and calculates the scheduling coefficient. In other words, the user equipment state management unit 254 conducts steps S4 to S8 in FIG. 2.

The mobility management for the user equipments (UEs) specifically includes handover management in switching UE's communicating cells, and the handover includes not only intra-frequency handover, but also inter-frequency handover and inter-system handover (handover to a system using a different radio access technology, Inter-RAT handover). If the inter-frequency handover and the inter-system handover are conducted, management and control of measurement gap are conducted in the user equipment state management unit 254.

The user equipment state management unit 254 sets the maximum user multiplexing number in a subframe to be scheduled and counts the numbers of MBMS channels (MCHs), dynamic broadcast channels (D-BCHs), paging channel (PCHs), response channels for random access channel (RACH), channels for random access channel (RACH) message 4 and so on in the subframe.

Particularly, the user equipment state management unit 254 manages the above-mentioned cumulative value (Count) for individual user equipments to be scheduled. Specifically, the user equipment state management unit 254 increments the cumulative value upon satisfying a predefined condition, compares the cumulative value with a threshold, determines the CQI request bit value depending on the comparison, and so on. In the case of the first exemplary operation, the predefined condition relates to whether DL-SCH has been transmitted to the user equipment associated with the cumulative value (step S32 in FIG. 3). In the second exemplary operation, the predefined condition relates to whether the ranking of the scheduling coefficient for the user equipment associated with the cumulative value falls within the predefined ranking value (step S52 in FIG. 5). The determination as to whether the predefined condition is satisfied may be made in the user equipment state management unit 254, the scheduling coefficient calculation unit 256 or the UE selection unit 258. If it is determined based on the comparison that the cumulative value is greater than the threshold, the CQI request bit having a predefined value (e.g., "1") together with the uplink scheduling grant information is transmitted to the user equipment (which is indicated to report the CQI). Otherwise, the CQI request bit having another predefined value (e.g., "0") together with the uplink scheduling grant information is transmitted to the user equipment.

The scheduling coefficient calculation unit 256 conducts steps S2, S10 and S12 in FIG. 2. Specifically, the scheduling coefficient calculation unit 256 calculates the scheduling coefficients $C_{n,k}$ in the subframe for the individual user equipments.

The UE selection unit 258 selects radio resource assigned user equipments based on the scheduling coefficients. The UE selection unit 258 provides the transport format resource block selection unit (TFR Selection) unit 268 with the number $N_{DL-SCH}$ of user equipments to which radio resources are assigned through the scheduling.

The TFR selection unit 268 determines the transmission format for the actually transmitted DL-SCH and assigns radio resources.

The common CH/MCH resource management unit 262 conducts the transmission format determination and the radio resource assignment for the MCH and the common channels such as synchronization channels (SCHs), physical broadcast channels (P-BCHs), dynamic broadcast channels (D-BCHs), paging channels (PCHs), random access channel (RACH) responses and RACH messages 4. Information on frequency resources in the radio resources is transmitted to the frequency resource management unit 264.

The frequency resource management unit 264 manages the frequency resources by communicating to the TFR selection unit 268, the common CH/MCH resource management unit 262 and the persistent resource management unit 266. More specifically, the frequency resource management unit 264 monitors remaining frequency resources available for the downlink shared channels to be scheduled and supplies information necessary for operations by the TFR selection unit 268.

The persistent resource management unit 266 manages the state of the persistent scheduling applied DL-SCH and the radio resources. More specifically, the persistent resource management unit 266 conducts the transmission format determination and the radio resource management for the persistent scheduling applied DL-SCH. Then, the persistent resource management unit 266 indicates the frequency resources in the radio resources to the frequency resource management unit 264. The persistent resource management unit 266 provides the user equipment state management unit 254 with information necessary for step S6 in the user equipment state management unit 254.

The MAC control signal generation unit 260 determines whether to transmit the MAC control signal to individual user equipments UEs. If it is determined that the MAC control signal is to be transmitted, the information is transmitted to the user equipment state management unit 254. Also, if the MAC control signal is actually mapped to MAC protocol data unit (MAC PDU), the MAC control signal generation unit 260 supplies the MAC control signal to the TFR selection unit 268.

The MAC control signal includes a timing advance for adjusting transmission timing of uplink signals, a control signal for indicating establishment of uplink synchronization, a control signal for indicating the user equipment to enter DRX state, and so on. The determination as to whether to transmit the control signal is made based on information from the user equipment state management unit 254 and the layer 1 processing unit 252.

The HARQ control unit 270 conducts hybrid retransmission control (HARQ) operations for individual user equipments.

The RLC/PDCP processing unit 272 controls RLC layer and PDCP layer for individual user equipments UEs. The RLC/PDCP processing unit 272 provides RLC buffers associated with k logical channels for each of n user equipments to store the separate logical channels. Although the RLC buffer (RLC $Buf_{n,k}$) buffers RLC layer data, the RLC layer data and the PDCP layer data may be buffered instead.

The present invention may be applied to any appropriate mobile communication system desired to adjust the CQI reporting frequency appropriately. For example, the present invention may be applied to HSDPA/HSUPA based W-CDMA systems, GSM based systems, TDD-CDMA based systems, CDMA 2000 based systems, WiMAX based systems, Wi-Fi based systems, LTE based systems, IMT-Advanced systems and so on.

The present invention has been described with reference to the specific embodiments, but the embodiments are simply illustrative, and those skilled in the art will understand various variations, modifications, alterations and substitutions. Separation by items is not essential to the present invention, and descriptions in two or more of the items may be used as needed. For example, the first exemplary operation and the second exemplary operation may be used together. For example, if the ranking of the scheduling coefficient falls within the upper tenth, the cumulative value may be incremented by one point, and if a shared channel has been actually assigned, the cumulative value may be further incremented by one point. In the above-mentioned embodiments, the cumulative value is gradually increased, but the cumulative value may be decreased from a predefined value.

The periodical CQI reporting in the PUCCH and the CQI reporting upon explicit requests may be used together. For example, the CQI averaged over all frequency bands may be periodically reported, and differences between the averaged CQI and the CQIs for the individual frequency bands may be reported upon explicit requests from a base station.

For convenience of explanation, apparatuses according to the embodiments of the present invention have been described with reference to functional block diagrams, but these apparatuses may be implemented in hardware, software or combinations thereof. In the above description, some specific numerical values are used for better understanding of the present invention. Unless specifically indicated, however, these numerical values are simply illustrative and any other suitable values may be used. The present invention is not limited to the above embodiments, and variations, modifications, alterations and substitutions can be made by those skilled in the art without deviating from the spirit of the present invention.

This international patent application is based on Japanese Priority Application No. 2008-115486 filed on Apr. 25, 2008, the entire contents of which are hereby incorporated by reference.

LIST OF REFERENCE SYMBOLS

50: cell
$100_1, 100_2, 100_3, 100_n$: user equipment
200: base station apparatus
252: layer 1 processing unit
254: user equipment state management unit
256: scheduling coefficient calculation unit
258: UE selection unit
260: MAC control signal generation unit
262: common CH/MCH resource management unit
264: frequency resource management unit
266: persistent resource management unit
268: TFR selection unit
270 ($270_1, 270_2, \ldots, 270_n$) HARQ control unit
272: RLC/PDCP processing unit
$2721_{n,k}$: RLC buffer
300: access gateway apparatus
400: core network

The invention claimed is:

1. A base station apparatus, comprising:
a scheduler configured to schedule assignment of radio resources based on a scheduling coefficient for one or more user equipments;
a control signal generation unit configured to generate a control signal including reporting indication information for indicating whether the user equipment is to report downlink channel state information and scheduling grant information for indicating the scheduled assignment of the radio resources; and
a transmitting unit configured to transmit the control signal in a downlink,
wherein
a cumulative value is calculated for each of the user equipments,
the reporting indication information transmitted to a user equipment, whose cumulative value reaches a predefined value, indicates that the user equipment is to report the downlink channel state information, and
the cumulative value is updated if the scheduling coefficient satisfies a predefined condition.

2. The base station apparatus as claimed in claim 1, wherein if the scheduling coefficient corresponds to a value transmitted to the user equipment, the cumulative value is updated for the user equipment.

3. The base station apparatus as claimed in claim 1, wherein if the ranking of the scheduling coefficient for the user equipment falls within a predefined ranking in terms of upper scheduling coefficients in the scheduling, the cumulative value is updated for the user equipment.

4. The base station apparatus as claimed in claim 1, wherein the cumulative value reaching the predefined value is reset before the next scheduling.

5. The base station apparatus as claimed in claim 1, wherein the scheduling coefficient for the user equipment is proportional to an average transmission rate and an instantaneous transmission rate for the user equipment.

6. The base station apparatus as claimed in claim 1, wherein the base station apparatus indicates only the user equipment having a small variation of propagation environment to report a downlink channel state.

7. The base station apparatus as claimed in claim 1, wherein the base station apparatus indicates only the user equipment having pathloss less than or equal to a predefined threshold to report a downlink channel state.

8. The base station apparatus as claimed in claim 1, wherein the base station apparatus indicates the user equipment just completing a random access procedure independently of the cumulative value to report a downlink channel state.

9. The base station apparatus as claimed in claim 1, wherein if transmission timing of the downlink channel state information corresponds to transmission timing of an uplink sounding reference signal, the base station apparatus does not indicate the user equipment to report a downlink channel state.

10. The base station apparatus as claimed in claim 1, wherein if a magnitude of a frequency resource for an uplink signal for transmitting the downlink channel state information is less than or equal to a predefined threshold, the base station apparatus does not indicate the user equipment to report a downlink channel state.

11. A method for use in a base station apparatus in a mobile communication system, comprising the steps of:
scheduling assignment of radio resources based on a scheduling coefficient for one or more user equipments;
generating a control signal including reporting indication information for indicating whether the user equipment is to report downlink channel state information and scheduling grant information for indicating the scheduled assignment of the radio resources; and
transmitting the control signal in a downlink,
wherein
a cumulative value is calculated for each of the user equipments,
the reporting indication information transmitted to a user equipment, whose cumulative value reaches a predefined value, indicates that the user equipment is to report the downlink channel state information, and
the cumulative value is updated if the scheduling coefficient satisfies a predefined condition.

* * * * *